United States Patent
Bourgelas

(10) Patent No.: US 12,146,952 B2
(45) Date of Patent: Nov. 19, 2024

(54) METHOD AND SYSTEM FOR GENERATING A MERGED B-SCAN FOR ASSISTED ULTRASONIC INSPECTION FLAW SCREENING

(71) Applicant: Evident Canada, Inc., Québec (CA)

(72) Inventor: Tommy Bourgelas, Quebec (CA)

(73) Assignee: Evident Canada, Inc., Québec (CA)

(*) Notice: Subject to any disclaimer, the term of this patent is extended or adjusted under 35 U.S.C. 154(b) by 449 days.

(21) Appl. No.: 16/998,198

(22) Filed: Aug. 20, 2020

(65) Prior Publication Data
US 2021/0096246 A1 Apr. 1, 2021

Related U.S. Application Data

(60) Provisional application No. 62/907,836, filed on Sep. 30, 2019.

(51) Int. Cl.
*G01S 15/89* (2006.01)
*G01S 7/48* (2006.01)
*G01S 7/52* (2006.01)

(52) U.S. Cl.
CPC ........ *G01S 15/8927* (2013.01); *G01S 7/4808* (2013.01); *G01S 7/5208* (2013.01); *G01S 15/8995* (2013.01)

(58) Field of Classification Search
CPC ............. G01S 15/8927; G01S 15/8915; G01S 15/8906; G01S 15/89; G01S 15/88; G01S 15/8995; G01S 7/4808; G01S 7/003; G01S 17/00; G01S 17/02; G01S 17/04; G01S 17/06; G01S 17/10; G01S 17/26;
(Continued)

(56) References Cited

U.S. PATENT DOCUMENTS 6,089,096 A * 7/2000 Alexandru .......... G01S 15/8925
73/625
6,468,218 B1 * 10/2002 Chen ...................... A61B 6/469
600/443
(Continued)

FOREIGN PATENT DOCUMENTS

| CN | 109991312 A | 7/2019 |
| CN | 114450603 A | 5/2022 |
| WO | WO-2021062526 A1 | 4/2021 |

OTHER PUBLICATIONS

"International Application Serial No. PCT CA2020 051292, International Search Report mailed Nov. 25, 2020", 3 pgs.
(Continued)

*Primary Examiner* — Lisa M Caputo
*Assistant Examiner* — Eric Sebastian Von Wald
(74) *Attorney, Agent, or Firm* — Schwegman Lundberg & Woessner, P.A.

(57) ABSTRACT

Example embodiments of the present subject matter relate to methods, systems, and a computer program product for performing assisted ultrasonic inspection flaw screening. The method includes analyzing a plurality of ultrasonic responses having scan axis and ultrasound axis positions. For a plurality of respective scan axis-ultrasound axis positions, an ultrasonic response representative of ultrasonic responses for the scan axis-ultrasound axis position is selected. The selected ultrasonic responses then may be associated for ultrasonic inspection flaw screening.

15 Claims, 5 Drawing Sheets

(58) Field of Classification Search
CPC ............... G01S 7/5208; G01S 7/52079; G01S 7/52017; G01S 7/52034; G01S 7/52026; A61B 8/54; A61B 8/5207; G01N 29/069; G01N 29/0654; G01N 29/262; G01N 29/0645; G01N 2291/106; G01N 2291/044
See application file for complete search history.

(56) References Cited

U.S. PATENT DOCUMENTS

| | | | | |
|---|---|---|---|---|
| 8,776,604 | B2* | 7/2014 | Yamano | G01N 29/043 73/622 |
| 9,759,692 | B2* | 9/2017 | St-Laurent | G01N 29/24 |
| 10,895,557 | B2* | 1/2021 | Yamamoto | G01N 29/0645 |
| 2003/0089171 | A1 | 5/2003 | Kenefick et al. | |
| 2010/0106432 | A1* | 4/2010 | Kitazawa | G01N 29/0609 702/39 |
| 2010/0268082 | A1* | 10/2010 | McLaughlin | G01N 29/06 600/443 |
| 2012/0128266 | A1 | 5/2012 | Zhang et al. | |
| 2013/0286778 | A1* | 10/2013 | Kisner | G01S 15/89 367/87 |
| 2013/0338506 | A1* | 12/2013 | Kim | A61B 8/4494 600/447 |
| 2014/0204702 | A1* | 7/2014 | Ratering | G03H 3/00 367/8 |
| 2019/0008485 | A1* | 1/2019 | Li | G01S 15/8952 |
| 2019/0234912 | A1* | 8/2019 | Davis | G01N 29/265 |

OTHER PUBLICATIONS

"International Application Serial No. PCT CA2020 051292, Written Opinion mailed Nov. 25, 2020", 6 pgs.

"Canadian Application Serial No. 3,152,727, Office Action mailed May 12, 2023", 4 pgs.

"European Application Serial No. 20871579.7, Response filed Nov. 5, 2022 to Communication pursuant to Rules 161(2) and 162 EPC", 6 pgs.

"Canadian Application Serial No. 3,152,727, Response filed Sep. 12, 2023 to Office Action mailed May 12, 2023", 11 pgs.

"European Application Serial No. 20871579.7, Extended European Search Report mailed Sep. 11, 2023", 9 pgs.

"European Application Serial No. 20871579.7, Response filed Mar. 30, 2024 to Extended European Search Report mailed Sep. 11, 2023", 6 pgs.

* cited by examiner

METHOD AND SYSTEM FOR GENERATING A MERGED B-SCAN FOR ASSISTED ULTRASONIC INSPECTION FLAW SCREENING

CLAIM OF PRIORITY

This patent application claims the benefit of priority U.S. Provisional Patent Application Ser. No. 62/907,836, titled "METHOD AND SYSTEM FOR GENERATING A MERGED B-SCAN FOR ASSISTED ULTRASONIC INSPECTION FLAW SCREENING," filed on Sep. 30, 2019, which is hereby incorporated by reference herein in its entirety.

TECHNICAL FIELD

This application relates to ultrasonic inspection.

BACKGROUND

Phased array ultrasonic testing (PAUT) is an advanced nondestructive examination technique that utilizes a set of ultrasonic testing (UT) probes made up of numerous small elements, each of which is pulsed individually with computer-calculated timing, and can be used to inspect more complex geometries that are difficult and much slower to inspect with single probes. PAUT can be used to inspect almost any material where traditional UT methods have been utilized, such as weld inspection, crack detection, and corrosion monitoring, and may be used across a wide range of industries including aerospace, power generation, petrochemical, metal billet and tubular goods suppliers, pipeline construction and maintenance, structural metals, and general manufacturing.

Compared to other forms of UT, PAUT has several advantages: (i) PAUT can be conducted more quickly than other forms of UT; (ii) it can easily be used for repeat scans because it has a high degree of repeatability; (iii) by emitting beams of different angles sequentially, PAUT is able to create detailed and accurate cross-sections of a part; and (iv) it is also particularly useful in situations where there is less room for mechanical scanning because PAUT inspection is able to sweep the beam without moving the probe. A workflow for PAUT inspection of a target (e.g., a weld) can be divided in three major steps: screening (e.g., finding indications and flaws), characterization (e.g., flaw sizing and identification), and reporting (e.g., putting together measurements relative to a flaw and making a judgment). While the actual PAUT scanning can be conducted quickly, this workflow can be quite time consuming.

SUMMARY

Examples described herein relate to methods, systems, and a computer program product for performing assisted ultrasonic inspection flaw screening. The method includes analyzing a plurality of ultrasonic responses corresponding to specified scan axis and specified ultrasound axis positions. For a plurality of respective scan axis-ultrasound axis positions, an ultrasonic response representative of ultrasonic responses for the scan axis-ultrasound axis position is selected. The selected ultrasonic responses then may be associated (e.g. merged or otherwise associated) for use in ultrasonic inspection flaw screening.

Examples described herein relate to A method of ultrasonic inspection flaw screening, comprising: receiving scan data for different scan axis and ultrasound axis positions, including a plurality of ultrasonic responses for each of a plurality of intersecting scan axis-ultrasound axis positions; for each of the plurality of intersecting scan axis-ultrasound axis positions, selecting a representative ultrasonic response from the plurality of ultrasonic responses for the respective scan axis-ultrasound axis position; and merging selected ultrasonic responses for the plurality of intersecting scan axis-ultrasound axis positions to generate an image.

BRIEF DESCRIPTION OF THE DRAWINGS

The subject matter herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of embodiments thereof taken in conjunction with the accompanying drawings in which:

DETAILED DESCRIPTION

Phased array ultrasonic testing (PAW) inspection data (e.g., indications) typically includes geometric echoes, which can complicate the search for genuine flaw echoes. In practice, inspection analysts face a challenging task that may include striking a balance in their performance. A trade-off may exist between inspection throughput and a thoroughness of inspection as performed by an individual analyst.

Screening inspection data (e.g., finding indications and flaw scan be a complex process, generally involving an analyst searching for flaws manually in a dynamic and iterative manner. For example, an analyst can select an angle in a S-Scan (sectorial scan) which then displays a corresponding B-Scan which the analyst may screen for indications that may be flaws rather than simply geometry. However, the data available to the analyst may be limited to the selected S-Scan angle and the B-Scan position. The analyst then can go through the angles screening the corresponding B-Scan images for indications. Through this repetitive process, the analyst remembers or notes the positions of indications for cross-reference among the angles to determine whether the indication is a flaw or, for example, weld geometry. The process can generally involve a great deal of repetitive action going back and forth between various angles in the S-Scan and concentration comparing corresponding B-Scan images. This can be a challenging aspect of the screening process in which the analyst strives to ensure screening for flaws without unnecessarily including non-flaw indications.

Example embodiments of the present subject matter improve the efficiency of the screening process by assisting in identifying indications by providing a single, merged B-Scan view, thereby eliminating the need to repetitively transition back and forth (e.g., sweep) between various S-Scan angles and their corresponding B-Scan images. Accordingly, example embodiments of the present subject matter provide savings in reducing the time involved for the screening process and improve accuracy by reducing the chance of a missed or mischaracterized indication. It is anticipated that, for a weld with difficult screening characteristics, the savings will be on the order of two- or three-to-ten.

Figure 1:
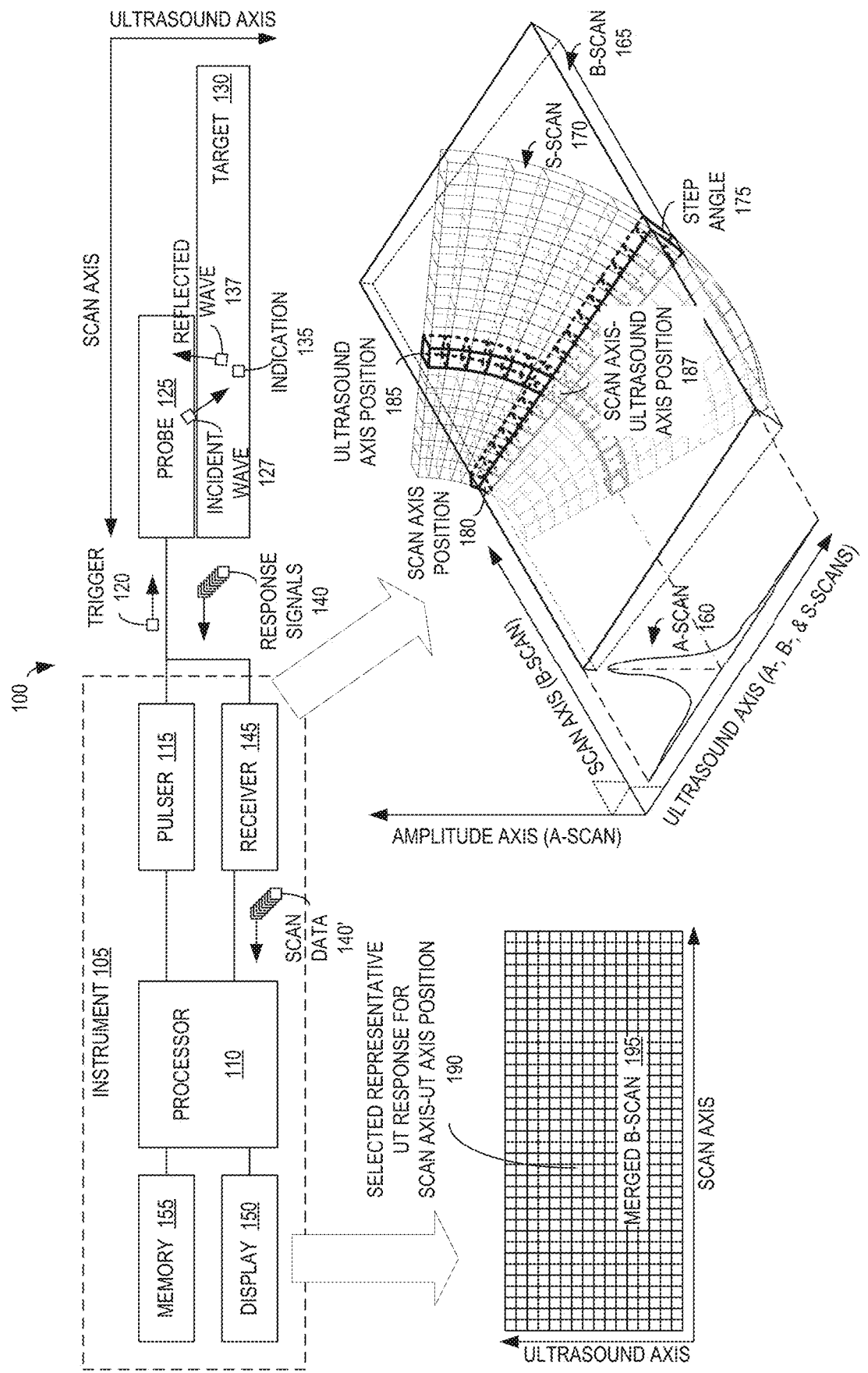
FIG. 1 is a block diagram illustrating a system for ultrasonic inspection flaw screening according to an example embodiment of the present subject matter.

FIG. 1 is a block diagram illustrating a system 100 for ultrasonic inspection flaw screening according to an example embodiment of the present subject matter. A typical ultrasonic inspection system 100 includes several functional units, such as a processor 110, a pulser 115, a receiver 145, a probe (e.g., transducer) 125, and a display device 150. As illustrated in FIG. 1, the system 100 includes an instrument 105 having the processor 110, the milker 115, the receiver 145, the display 150, and memory 155. The pulser 115 can produce high voltage electrical pulses. Under control of the processor 110 and driven by a trigger 120 from the pulser 115, the probe 125 generates high frequency ultrasonic energy. The sound energy is introduced and propagates through the target 130 material in the form of incident waves 127. When there is a discontinuity or other indication 135 (e.g., a crack) in the wave path, part of the energy will be reflected hack from the flaw surface as a reflected wave 137. The reflected wave signal 137 is transformed by the probe 125 into an electrical response signal 140 and received by the receiver 145 which may convert the response signals 140 into scan data 140' (e.g., A-Scan data and scan axis position data). The processor 110 then may receive the scan data 140' for analysis. In some embodiments, the scan data 140' is analyzed in real-time using the display 150 as it is received from the probe 125 and, in other embodiments, the scan data 140' may be stored to memory 155 for either offline analysis using the instrument display 150 or an external computer (not shown).

Figure 2:
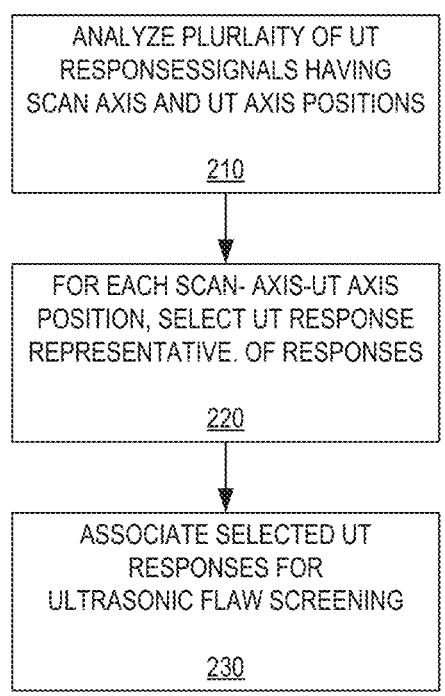
FIG. 2 is a flow diagram illustrating a method of ultrasonic inspection flaw screening according to an example embodiment of the present subject matter.
Figure 3A:
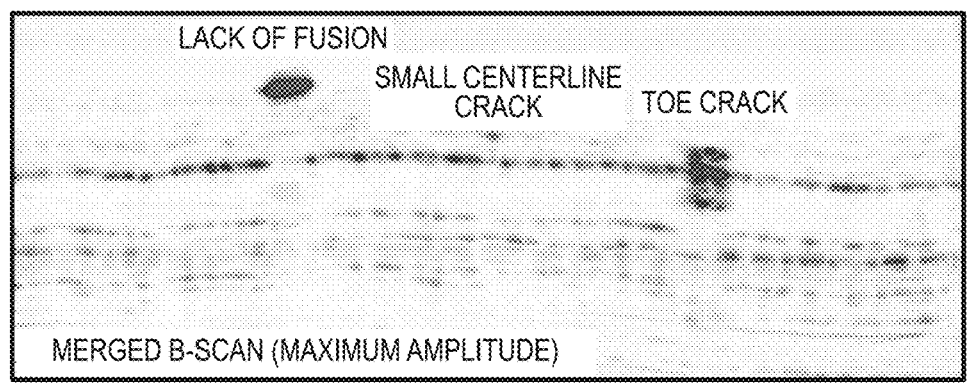
FIGS. 3A-3D are annotated B-Scan images generated by a system for ultrasonic inspection flaw screening according to an example embodiment of the present subject matter.
Figure 3B:
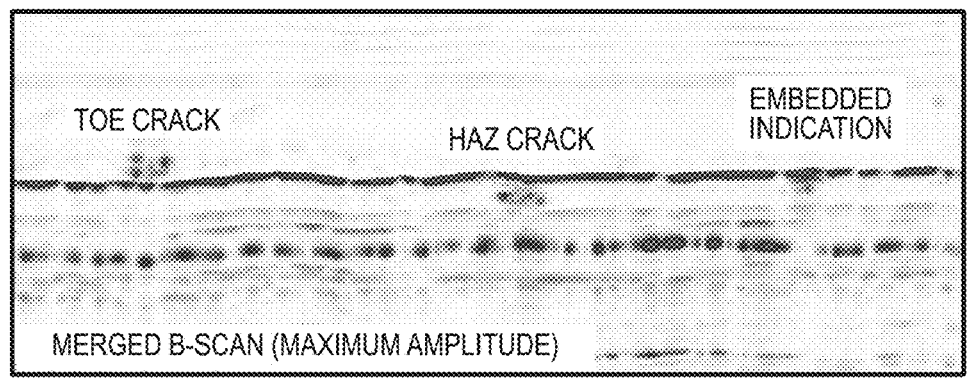
Figure 3C:
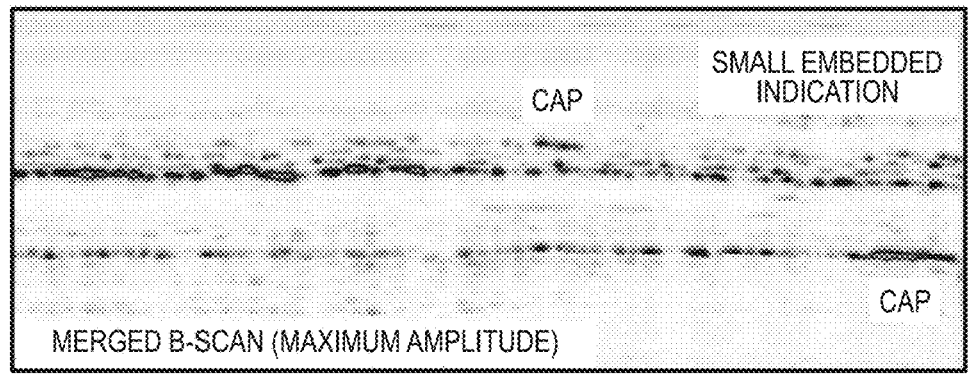
Figure 3D:
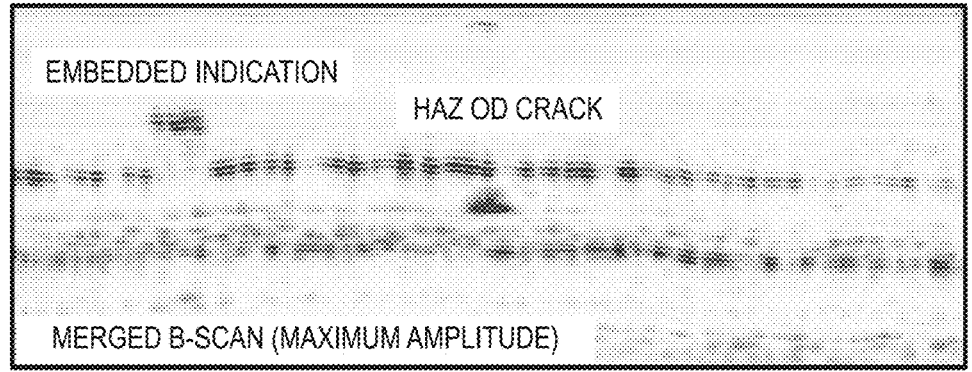

The remainder of FIG. 1 may be described in conjunction with FIG. 2 which is a flow diagram illustrating a method of ultrasonic inspection flaw screening according to an example embodiment of the present subject matter. As illustrated in FIG. 1, example embodiments of the present subject matter improve the efficiency of the screening process by assisting the analyst in identifying indications by providing a single, merged B-Scan 195 view (e.g., which may be produced on the instrument display 150 or an external display of an external computer (not shown)).

To generate the merged B-Scan 195, example embodiments of the present subject matter receive and analyze the scan data 140' for scan axis positions 180 and ultrasound axis positions 185 (step 210). Scan axis can refer to a common axis shared by the probe 125 and the target 130 (e.g., part being inspected) along the inspection path, e.g., the path the probe 125 traverses along the target 130. For example, for a weld inspection, the scan axis can be defined as an axis parallel to a long axis of a weld line, with the scan axis defining an inspection path for the probe. Ultrasound axis can refer to a propagation direction of the ultrasound wave (e.g., incident wave 127 and reflected wave 137) propagation, such as represented as rays extending toward or from an echogenic feature within the target 130 being inspected. For each intersecting respective scan axis-ultrasound axis position 187, the processor 110 selects a representative ultrasonic response 190 representative of ultrasonic responses for the scan axis-ultrasound axis position 185 (step 220). In other words, as illustrated in FIG. 1, at the scan axis position 180 there are a plurality of available data points at each ultrasound axis position 185 for each respective step angle 175 defining the range of angles in the S-Scan 170 (e.g., subsets of A-Scan data for ultrasound axis positions in each respective B-Scan in the range of angles in the S-Scan 170). Example embodiments of the present subject matter analyze the subsets of available A-Scan 160 data for the ultrasound axis position for each step angle 175 and select a representative subset of an A-Scan 160 data to be representative of the scan axis-ultrasound axis position 187 for S-Scans in the range of angles in the S-Scan 170.

Example embodiments of the present subject matter then associate the selected ultrasonic responses for ultrasonic inspection flaw screening (step 230). Having analyzed, for each scan axis-ultrasound axis position 187, the respective A-Scans for each step angle 175 in the range of angles of the S-Scan 170, example embodiments of the present subject matter have selected a subset of the A-Scan 160 data for each ultrasound axis position to be a representative ultrasonic response 190 for each scan axis-ultrasound axis position 187 in the plurality of B-Scans 165 and the plurality of S-Scans 170. This collection of selected subsets of A-Scan data (e.g., associated ultrasonic responses) is referred to as a merged B-Scan 195 and, like a traditional one of B-Scans 165, may be plotted in the ultrasound axis and the scan axis. It will be understood by one of ordinary skill in the art that, when presented to an analyst or operator for ultrasonic inspection flaw screening, the merged B-Scan 195 provides a summary view of the of the plurality of S-Scans 170 for the scan axis positions based on the selection criteria to simplify screening.

In certain embodiments of the present subject matter, to select the representative A-Scan for the scan axis-ultrasound axis position, the processor 110 may perform an operation on the set of A-Scans 160 for the range of scan angles in the S-Scan 170 for the scan axis-ultrasound axis position 187, such as on the A-Scan amplitude values or on a magnitude of such values. In other embodiments of the present subject matter, to select the representative A-Scan for the scan axis-ultrasound axis position, the processor 110 may select a maximum amplitude value from the plurality of A-Scans 160 for the range of scan angles in the S-Scan 170 for the scan axis-ultrasound axis position 187. The processor 110 may then compile the selected A-Scans 160 with the maximum amplitude value for each scan axis-ultrasound axis position and merge them to generate the merged B-Scan 195.

It should be understood by one of ordinary skill in the art that example embodiments of the present subject matter may be applied not only to sectorial scans but also are applicable to linear scans, compound scans and other electronic scanning techniques known now in the art and discovered in the future.

FIGS. 3A-3D are annotated B-Scan images generated by a system for ultrasonic inspection flaw screening according to an example embodiment of the present subject matter. As illustrated in FIGS. 3A-3D, example embodiments of the present subject matter display genuine flaws next to the weld geometry echoes in a single screen without the need to dynamically search for them by selecting various S-Scan angles. Accordingly, an analyst can instantly have a holistic view of the weld (or sections of it).

Another advantage provided by example embodiments of the present subject matter is that the sharpness of the merged B-Scan image and the resolution of each point can enable pre-characterization as some defect types also seem to have a specific signature or pattern from direct and mode-converted signals (e.g., lack of fusion, embedded flaws, heat affected zone cracks, outer diameter and inner diameter surface cracks, centerline cracks, toe cracks). Therefore, by employing example embodiments of the present subject matter, a skilled operator can examine the merged B-Scan and be assisted in the characterization of indications shown in the merged B-Scan image.

Moreover, straightening can be applied to the merged B-scans described herein. Some B-scan images may include weld geometry artifacts where drift can be observed. This drift is typically caused by mechanical offset error when scanning, or a changing weld geometry, or a combination of both. Regardless, compensating for drift by straightening of weld geometry signals can be made. To compensate for this drift, the indication (e.g., weld) in the merged B-scan can be detected and then straightened to remove the drift. The straightening can be implemented using time of flight correction to straighten weld geometry artifacts, and correct the drift seen in the B-scan image.

Figure 4:
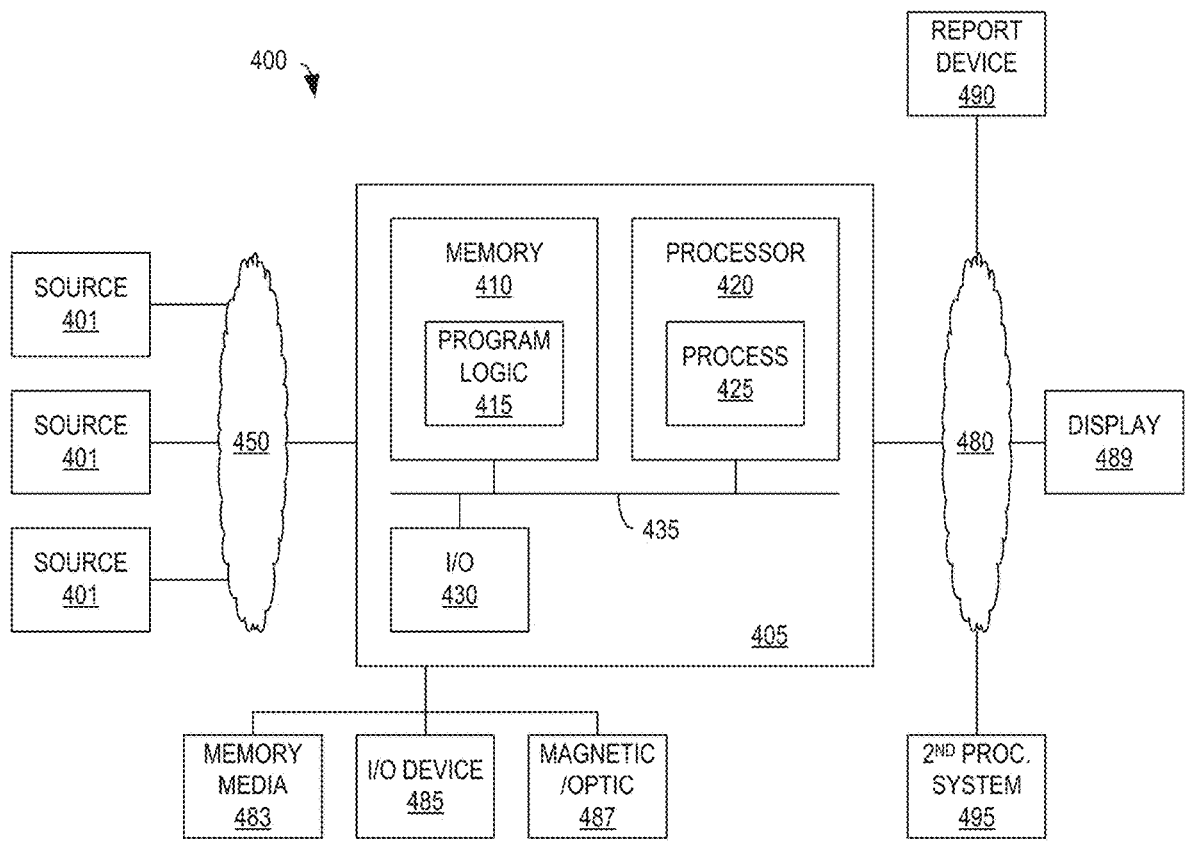
FIG. 4 is a block diagram illustrating an apparatus for ultrasonic inspection flaw screening according to an example embodiment of the present subject matter.

FIG. 4 is a block diagram of an example embodiment apparatus 405 for acquiring phased array ultrasonic testing data leveraging the principle of acoustic reciprocity according to an example embodiment of the present subject matter. The apparatus 405 may be part of a system 400 and includes memory 410 storing program logic 415, a processor 420 for executing a process 425, and a communications I/O interface 430, connected via a bus 435. The exemplary apparatus 405 is discussed only for illustrative purpose and should not be construed as a limitation on the embodiments or scope of the present disclosure. In some cases, some devices may be added to or removed from a computer system 400 based on specific situations.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information. The memory 410 may include a machine readable medium on which is stored one or more sets of data structures or instructions (e.g., software) embodying or utilized by any one or more of the techniques or functions described herein.

In some embodiments, the system may be embodied by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be re-ordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this disclosure may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 4, the machine becomes an apparatus for practicing examples of the present subject matter. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

The term "machine readable medium" or "machine readable storage medium" may include any medium that is capable of storing, encoding, or carrying instructions for execution by a machine and that cause the machine to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

Figure 5:
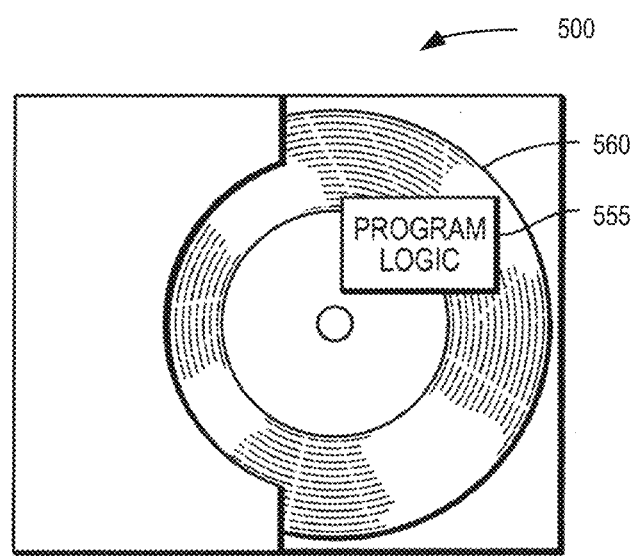
FIG. 5 is an illustration of an example embodiment of the present subject matter as embodied in a machine readable medium for ultrasonic inspection flaw screening.

FIG. 5 is a block diagram of a computer program product 500 including program logic 555, encoded on a computer-readable medium 560 in computer-executable code configured for acquiring phased array ultrasonic testing data leveraging the principle of acoustic reciprocity according to an example embodiment of the present subject matter. The logic for carrying out the method may be embodied as part of the aforementioned system, which is useful for carrying out a method described with reference to embodiments shown. In one embodiment, program logic 555 may be loaded into memory and executed by processor. In a further embodiment, program logic 555 may also be the same program logic 555 on a computer readable medium.

Although the foregoing examples have been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

Various embodiments of the present disclosure have been described with reference to the accompanying drawings. It may be appreciated that these example embodiments are provided only for enabling those skilled in the art to better understand and then further implement the present disclosure and not intended to limit the scope of the present disclosure in any manner. It should be noted that these drawings and description are only presented as examples of embodiments and, based on this description, alternative embodiments may be conceived that may have a structure and method disclosed as herein, and such alternative embodiments may be used without departing from the principle of the disclosure as claimed in the present disclosure.

It may be noted that the flowcharts and block diagrams in the figures may illustrate the apparatus, method, as well as architecture, functions and operations executable by a computer program product according to various embodiments of the present disclosure, in this regard, each block in the flowcharts or block diagrams may represent a module, a program segment, or a part of code, which may contain one or more executable instructions for performing specified logic functions. It should be further noted that, in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

The terms "comprise(s)," "include(s)", their derivatives, and like expressions used herein should be understood to be open (i.e., "comprising/including, but not limited to"). The term "based on" means "at least in part based on", the term "one embodiment" means "at least one embodiment", and the term "another embodiment" indicates "at least one further embodiment". Relevant definitions of other terms have been provided.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method of ultrasonic inspection flaw screening for weld inspection, comprising:

receiving scan data corresponding to different beam angles for different scan axis and ultrasound axis positions of an object including a weld, including a plurality of ultrasonic responses for each of a plurality of intersecting scan axis-ultrasound axis positions, wherein the scan axis is parallel to a long axis of a weld line of the weld;

for each of the plurality of intersecting scan axis-ultrasound axis positions, selecting a representative ultrasonic response with a maximum amplitude value from the plurality of ultrasonic responses for the respective scan axis-ultrasound axis position based on amplitude values of the plurality of ultrasonic responses;

merging selected ultrasonic responses for the plurality of intersecting scan axis-ultrasound axis positions to generate an image for weld inspection;

detecting a drift in a geometry of the weld in the image; and straightening the merged ultrasonic responses to reduce or remove the drift in the image.

2. The method of claim 1, wherein the plurality of ultrasonic responses for each of the plurality of intersecting scan axis-ultrasound axis positions includes a plurality of A-scans for a range of scan angles in a S-scan for the respective scan axis-ultrasound axis position.

3. The method of claim 1, further comprising:
displaying the image, wherein the image is a merged B-scan image.

4. The method of claim 1, wherein receiving scan data includes retrieving the scan data from a memory.

5. The method of claim 1, wherein selecting the representative ultrasonic response comprises performing an operation on the plurality of ultrasonic responses for the respective scan axis-ultrasound axis position.

6. A system comprising:
one or more processors of a machine; and
a memory storing instructions that, when executed by the one or more processors, cause the machine to perform operations comprising:
receiving scan data corresponding to different beam angles for different scan axis and ultrasound axis positions of an object including a weld, including a plurality of ultrasonic responses for each of a plurality of intersecting scan axis-ultrasound axis positions, wherein the scan axis is parallel to a long axis of a weld line of the weld;
for each of the plurality of intersecting scan axis-ultrasound axis positions, selecting a representative ultrasonic response with a maximum amplitude value from the plurality of ultrasonic responses for the respective scan axis-ultrasound axis position based on amplitude values of the plurality of ultrasonic responses;
merging selected ultrasonic responses for the plurality of intersecting scan axis-ultrasound axis positions to generate an image for weld inspection;
detecting a drift in a geometry of the weld in the image; and
straightening the merged ultrasonic responses to reduce or remove the drift in the image.

7. The system of claim 6, wherein the plurality of ultrasonic responses for each of the plurality of intersecting scan axis-ultrasound axis positions includes a plurality of A-scans for a range of scan angles in a S-scan for the respective scan axis-ultrasound axis position.

8. The system of claim 6, further comprising:
a display device to display the image, wherein the image is a merged B-scan image.

9. The system of claim 6, further comprising:
an ultrasound probe to capture the scan data.

10. The system of claim 6, wherein selecting the representative ultrasonic response comprises performing an operation on the plurality of ultrasonic responses for the respective scan axis-ultrasound axis position.

11. A non-transitory machine readable storage medium that, when executed by a machine, cause the machine to perform operations comprising:
receiving scan data corresponding to different beam angles for different scan axis and ultrasound axis positions of an object including a weld, including a plurality of ultrasonic responses for each of a plurality of intersecting scan axis-ultrasound axis positions, wherein the scan axis is parallel to a long axis of a weld line of the weld;
for each of the plurality of intersecting scan axis-ultrasound axis positions, selecting a representative ultrasonic response with a maximum amplitude value from the plurality of ultrasonic responses for the respective scan axis-ultrasound axis position based on amplitude values of the plurality of ultrasonic responses;
merging selected ultrasonic responses for the plurality of intersecting scan axis-ultrasound axis positions to generate an image for weld inspection;
detecting a drift in a geometry of the weld in the image; and
straightening the merged ultrasonic responses to reduce or remove the drift in the image.

12. The non-transitory machine readable storage medium of claim 11, wherein the plurality of ultrasonic responses for each of the plurality of intersecting scan axis-ultrasound axis positions includes a plurality of A-scans for a range of scan angles in a S-scan for the respective scan axis-ultrasound axis position.

13. The non-transitory machine readable storage medium of claim 11, further comprising:
displaying the image, wherein the image is a merged B-scan image.

14. The non-transitory machine readable storage medium of claim 11, wherein receiving scan data includes retrieving the scan data from a memory.

15. The non-transitory machine readable storage medium of claim 11, wherein selecting the representative ultrasonic response comprises performing an operation on the plurality of ultrasonic responses for the respective scan axis-ultrasound axis position.

* * * * *